US012501215B2

(12) United States Patent
Saito

(10) Patent No.: US 12,501,215 B2
(45) Date of Patent: Dec. 16, 2025

(54) SPEAKER OUTPUT CHARACTERISTIC CORRECTION SYSTEM AND SOUND SYSTEM

(71) Applicant: Alps Alpine Co., LTD., Tokyo (JP)

(72) Inventor: Yuji Saito, Fukushima (JP)

(73) Assignee: Alps Alpine Co., LTD., Tokyo (JP)

( * ) Notice: Subject to any disclaimer, the term of this patent is extended or adjusted under 35 U.S.C. 154(b) by 194 days.

(21) Appl. No.: 18/376,643

(22) Filed: Oct. 4, 2023

(65) Prior Publication Data

US 2024/0137698 A1 Apr. 25, 2024
US 2024/0236565 A9 Jul. 11, 2024

(30) Foreign Application Priority Data

Oct. 19, 2022 (JP) ................................ 2022-167429

(51) Int. Cl.

| | |
|---|---|
| ***H03F 3/183*** | (2006.01) |
| ***G01R 31/28*** | (2006.01) |
| ***H04R 3/00*** | (2006.01) |
| ***H04R 3/04*** | (2006.01) |
| ***H04R 19/04*** | (2006.01) |
| ***H04R 29/00*** | (2006.01) |

(52) U.S. Cl.
CPC ............ *H04R 3/04* (2013.01); *H04R 29/001* (2013.01); *H04R 2430/01* (2013.01); *H04R 2430/03* (2013.01)

(58) Field of Classification Search
CPC .... H04R 3/04; H04R 29/001; H04R 2430/01; H04R 2430/03; H04R 3/002; H04R 29/002; H04R 29/004; H04R 3/007
USPC .............................................. 381/55, 59, 96
See application file for complete search history.

(56) References Cited

U.S. PATENT DOCUMENTS

| | | | | |
|---|---|---|---|---|
| 10,104,470 | B2 | 10/2018 | Kon | |
| 11,871,203 | B2 * | 1/2024 | Bernardini | H04R 9/06 |
| 12,035,115 | B2 * | 7/2024 | Saito | H04R 3/007 |

(Continued)

FOREIGN PATENT DOCUMENTS

JP 2013-085111 5/2013

OTHER PUBLICATIONS

Extended European Search Report in European Application No. 23203012.2, dated Mar. 18, 2024, 10 pages.

(Continued)

*Primary Examiner* — Xu Mei
(74) *Attorney, Agent, or Firm* — Crowell & Moring LLP

(57) ABSTRACT

A controller calculates individual parameters, including nonlinear parameters of a speaker model, based on a measured displacement of a vibration system of a speaker. A sound generator outputs an audio signal, and an output flattening filter adjusts gains of individual bands of an audio signal so that a frequency characteristic of a volume of sound output by the speaker is flattened in accordance with a speaker model obtained by linearizing calculated parameters and outputs a resultant audio signal. A nonlinear inverse filter corrects the resultant audio signal by signal processing adapted to the gains of the output flattening filter so that the nonlinear distortion of the speaker is suppressed in accordance with the speaker model including the nonlinear parameters and outputs the corrected audio signal as an output audio signal to the speaker via an amplifier.

8 Claims, 7 Drawing Sheets

(56) References Cited

U.S. PATENT DOCUMENTS

| | | | | |
|---|---|---|---|---|
| 2003/0142832 | A1* | 7/2003 | Meerkoetter | H04R 29/003<br>381/59 |
| 2005/0008170 | A1 | 1/2005 | Pfaffinger et al. | |
| 2015/0249889 | A1* | 9/2015 | Iyer | H04R 3/08<br>381/98 |
| 2017/0318389 | A1* | 11/2017 | Bjork | H04R 3/08 |
| 2017/0318390 | A1 | 11/2017 | Bjork et al. | |
| 2023/0276185 | A1* | 8/2023 | Saito | H04R 29/003 |

OTHER PUBLICATIONS

Kitagawa et al., "Linearization ability evaluation for loudspeaker systems using dynamic distortion measurement," IEICE Transactions on Fundamentals of Electronics, Communications and Computer Sciences, Feb. 2011, 94(2):813-816.

* cited by examiner

FIG. 7

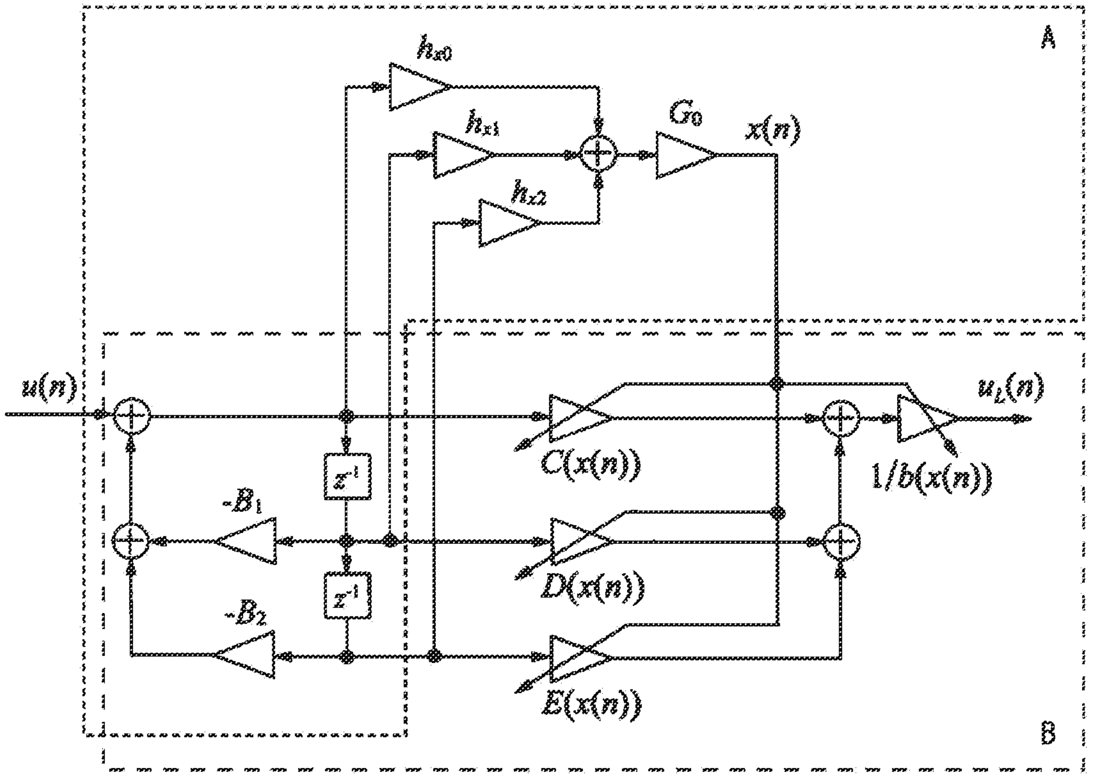

$$B_1 = \left(-2 + \frac{\omega_0^2}{2f_s^2}\right) \Big/ \alpha$$

$$B_2 = \left(1 - \frac{\omega_0}{2Q_0 f_s} + \frac{\omega_0^2}{4f_s^2}\right) \Big/ \alpha$$

$$h_{x0} = h_{x2} = \frac{h_{x1}}{2} = \frac{1}{4f_s^2} \Big/ \alpha$$

$$C(x(n)) = 1 + \left[\frac{\omega_0}{2Q_0 f_s}\left(1 - \frac{Q_0}{Q_m}\right)\left(b(x(n))^2 - 1\right) + \frac{\omega_0^2}{4f_s^2}\left(k(x(n)) - 1\right)\right] \Big/ \alpha$$

$$D(x(n)) = B_1 + \frac{\omega_0^2}{2f_s^2}\left(k(x(n)) - 1\right) \Big/ \alpha$$

$$E(x(n)) = B_2 + \left[-\frac{\omega_0}{2Q_0 f_s}\left(1 - \frac{Q_0}{Q_m}\right)\left(b(x(n))^2 - 1\right) + \frac{\omega_0^2}{4f_s^2}\left(k(x(n)) - 1\right)\right] \Big/ \alpha$$

$$G_0 = \frac{Bl_0 A_0}{R_e m_0}$$

HERE, $$\alpha = 1 + \frac{\omega_0}{2Q_0 f_s} + \frac{\omega_0^2}{4f_s^2},$$

$$\omega_0 = \sqrt{\frac{K_0}{m_0}},$$

$$Q_0 = \frac{\sqrt{m_0 K_0}}{R_m + Bl_0^2/R_e},$$

$$Q_m = \frac{\sqrt{m_0 K_0}}{R_m},$$

NOTE:

$$Bl(x) = Bl_0 b(x) = Bl_0(1 + b_1 x + b_2 x^3),$$

$$K(x) = K_0 k(x) = K_0(1 + k_1 x + k_2 x^2),$$

SPEAKER OUTPUT CHARACTERISTIC CORRECTION SYSTEM AND SOUND SYSTEM

RELATED APPLICATION

The present application claims priority to Japanese Patent Application Number 2022-167429, filed Oct. 19, 2022, the entirety of which is hereby incorporated by reference.

BACKGROUND

1. Field of the Disclosure

The present disclosure relates to a technique of correcting an output characteristic of a speaker.

2. Description of the Related Art

As a technique of correcting an output characteristic of a speaker, a technique of flattening a frequency characteristic of a volume of sound output by a speaker by outputting an audio signal to the speaker through an inverse filter that has an inverse characteristic of the frequency characteristic of the speaker has been used (e.g., JP 2013-85111 A).

Furthermore, examples of techniques relating to the present disclosure include an equivalent circuit of a speaker as illustrated in FIG. 6 (Klippel, Wolfgang, "Modeling the large signal behavior of micro-speakers", 133rd Audio Engineering Society Convention 2012, Paper Number 8749, Oct. 25, 2012).

In FIG. 6, the equivalent circuit has the following parameters.

Re; Electrical Resistance

Le(x, i); Electrical Inductance

Bl(x); Force factor

Fm(x, i); Reluctance Force $m_0$; Mechanical mass

Rm(v); Mechanical Resistance

K(x); Stiffness (stiffness property)

In this equivalent model, Bl(x), K(x), and Le(x, i) are nonlinear characteristics and cause nonlinear distortion of the speaker.

Furthermore, also as a technique relating to the present disclosure, a nonlinear distortion correction system that corrects nonlinear distortion of a speaker using a Mirror filter as illustrated in FIG. 7 has been used (Yoshinobu Kajikawa (Faculty of Systems Science and Engineering, Kansai University), "Nonlinear Distortion Correction of Speaker System by Signal Processing Techniques," Journal of the Acoustical Society of Japan, Vol. 67, No. 10 (2011), pp. 470475).

Here, in FIG. 7, u(n) indicates an input audio signal and fs indicates a sampling frequency of the input audio signal u(n). Furthermore, Re indicates a DC resistance of a voice coil and corresponds to Re in the equivalent circuit illustrated in FIG. 6. Rm indicates a mechanical resistance of a vibration system and corresponds to Rm(v) in the equivalent circuit illustrated in FIG. 6. Moreover, $m_0$ indicates an equivalent mass of the vibration system and corresponds to mo in the equivalent circuit illustrated in FIG. 6. K(x) indicates stiffness and corresponds to K(x) in the equivalent circuit illustrated in FIG. 6. Bl(x) indicates a force coefficient and corresponds to Bl(x) in the equivalent circuit illustrated in FIG. 6. $A_0$ indicates a gain of an analog section.

In the nonlinear distortion correction system illustrated in FIG. 7, a block A predicts a displacement x(n) of the vibration system in accordance with a linear speaker model, and a block B predicts an amount of nonlinear distortion using the displacement x(n) predicted by the block A in accordance with the nonlinear speaker model, corrects the input audio signal u(n) so that the nonlinear distortion is not generated based on the prediction, and outputs a corrected audio signal $u_L(n)$.

According to this nonlinear distortion correction system, an inverse characteristic of a nonlinear characteristic of the speaker is applied to the input audio signal u(n) so that an audio signal $u_L(n)$ that is free from nonlinear distortion is output.

The larger an audio signal input to a speaker becomes, the greater an effect of nonlinearity of the speaker becomes and the greater nonlinear distortion of an output of the speaker becomes. In particular, the nonlinear distortion is noticeably larger in a low frequency range where oscillation for the same magnitude of an input is larger than that in a high frequency range.

According to the technique of flattening a frequency characteristic of a volume of sound output by the speaker using an inverse filter described above, an audio signal with a large low-frequency sound is output to the speaker having a characteristic of a lower volume in the low-frequency region, and therefore, larger nonlinear distortion is generated when this technique is employed.

SUMMARY

Accordingly, it is an object of the present disclosure to suppress generation of nonlinear distortion of a speaker while flattening a frequency characteristic of a volume of sound output by the speaker.

To address the aforementioned problem, according to forms of the present disclosure, a speaker output characteristic correction system that corrects an output characteristic of a speaker for an audio signal output from a sound generator includes an output flattening filter configured to receive an audio signal output from the sound generator as an input first audio signal and to output a second audio signal and a nonlinear inverse filter configured to receive the second audio signal as an input and to output a resultant signal to the speaker. Here, a filter characteristic for adjusting gains of individual bands of the first audio signal so that a frequency characteristic of a volume of sound output by the speaker relative to the first audio signal is flattened is set to the output flattening filter as a filter characteristic of the output flattening filter, and an inverse characteristic of a nonlinear characteristic of the speaker is set to the nonlinear inverse filter as a filter characteristic of the nonlinear inverse filter.

In some implementations, the speaker output characteristic correction system may include a displacement measurement section configured to measure a displacement of a vibration system of the speaker, a speaker model calculator configured to calculate a speaker model of the speaker having a plurality of parameters including nonlinear parameters based on the displacement measured by the displacement measurement section in a state in which a predetermined audio signal is output to the speaker, and a filter characteristic setter configured to calculate a linear approximation speaker model that is a speaker model in which the individual parameters of the calculated speaker model are linearized, to calculate a filter characteristic in which a frequency characteristic of a volume of sound output by the speaker is flattened in accordance with the calculated linear approximation speaker model, and to set the calculated filter characteristic to the output flattening filter as a filter characteristic of the output flattening filter.

In some implementations, the output flattening filter may include a band divider configured to divide the first audio signal into a plurality of per-band signals, which are signals for individual bands of the first audio signal, gain calculators corresponding to the individual bands, which are configured to calculate gains of the bands, gain adjusters corresponding to the individual bands, which are configured to provide the gains of the individual bands calculated by the gain calculators to the per-band signals of the bands, and a mixer configured to mix the per-band signals having gains adjusted by the gain adjusters and to output resultants as the second audio signal. Here, each of the gain calculators corresponding to the individual bands may include a linear approximation speaker model configured to receive a corresponding one of the per-band signals of the bands as an input, a flattening speaker model configured to receive a corresponding one of the per-band signals of the bands as an input, and a gain output section configured to output a value obtained by dividing an effective value of an output of the flattening speaker model by an effective value of an output of the linear approximation speaker model as a gain of the corresponding one of the bands. The filter characteristic setter may calculate, based on the calculated linear approximation speaker model, a speaker model in which a frequency characteristic of a volume of sound output by the speaker is flatter than the linear approximation speaker model as the flattening speaker model, and set a filter characteristic of the output flattening filter by setting the calculated linear approximation speaker model and the calculated flattening speaker model in the gain calculators corresponding to the individual bands.

In some implementations, the filter characteristic setter is configured to calculate a speaker model in which the parameters of the linear approximation speaker model are changed so that a resonance frequency moves to a lower frequency side relative to a resonance frequency of the linear approximation speaker model as the flattening speaker model.

In some implementations, the speaker output characteristic correction system described above may include a displacement measurement section configured to measure a displacement of a vibration system of the speaker, a speaker model calculator configured to calculate a speaker model of the speaker having a plurality of parameters including nonlinear parameters based on the displacement measured by the displacement measurement section in a state in which a predetermined audio signal is output to the speaker, and a filter characteristic setter configured to set, as the filter characteristic of the linear inverse filter, a filter characteristic that matches an inverse characteristic of a nonlinear characteristic of the speaker model indicated by the parameters of the speaker model calculated by the speaker model calculator.

In some implementations, in the speaker output characteristic correction system configured as described above, the linear inverse filter may include a first block configured to predict a displacement of a vibration system in accordance with a linear speaker model that is the same as or different from the linear approximation speaker model and to output the predicted displacement, a predicted displacement modifier configured to adjust the predicted displacement using a gain indicated by a value obtained by dividing an effective value of the second audio signal by an effective value of an audio signal output from the sound generator, and a second block configured to predict an amount of nonlinear distortion in accordance with the nonlinear speaker model using the predicted displacement adjusted by the predicted displacement modifier, to correct the second audio signal in accordance with the predicted amount of nonlinear distortion so that nonlinear distortion does not occur, and to output the resultant signal to the speaker. The filter characteristic setter may set the filter characteristic of the linear inverse filter by setting a characteristic of the first block and a characteristic of the second block as a characteristic according to the individual parameters of the speaker model calculated by the speaker model calculator.

In addition, the present disclosure also provides a sound system including the speaker output characteristic correction system described above, the speaker, and the sound generator.

According to forms of the speaker output characteristic correction system and the sound system described above, the nonlinear inverse filter may be used to suppress generation of nonlinear distortion of the speaker while the output flattening filter is used to flatten a frequency characteristic of a volume of sound output by the speaker.

It will be appreciated that when a speaker model of the speaker is calculated by measuring a displacement of a vibration system, etc., and characteristics of the output flattening filter and the nonlinear inverse filter are set in accordance with the calculated speaker model, even when the characteristic of the speaker changes over time, etc., the frequency characteristic of a volume of sound output from the speaker may be appropriately flattened and generation of nonlinear distortion may be appropriately suppressed thereafter by updating the speaker model of the speaker through measurement and performing a setting of a characteristic in accordance with the updated speaker model.

BRIEF DESCRIPTION OF THE DRAWINGS

FIG. 7 is a diagram illustrating a nonlinear distortion correction system in the related art.

DETAILED DESCRIPTION

An embodiment of the present disclosure will be described hereinafter.

Figure 1:
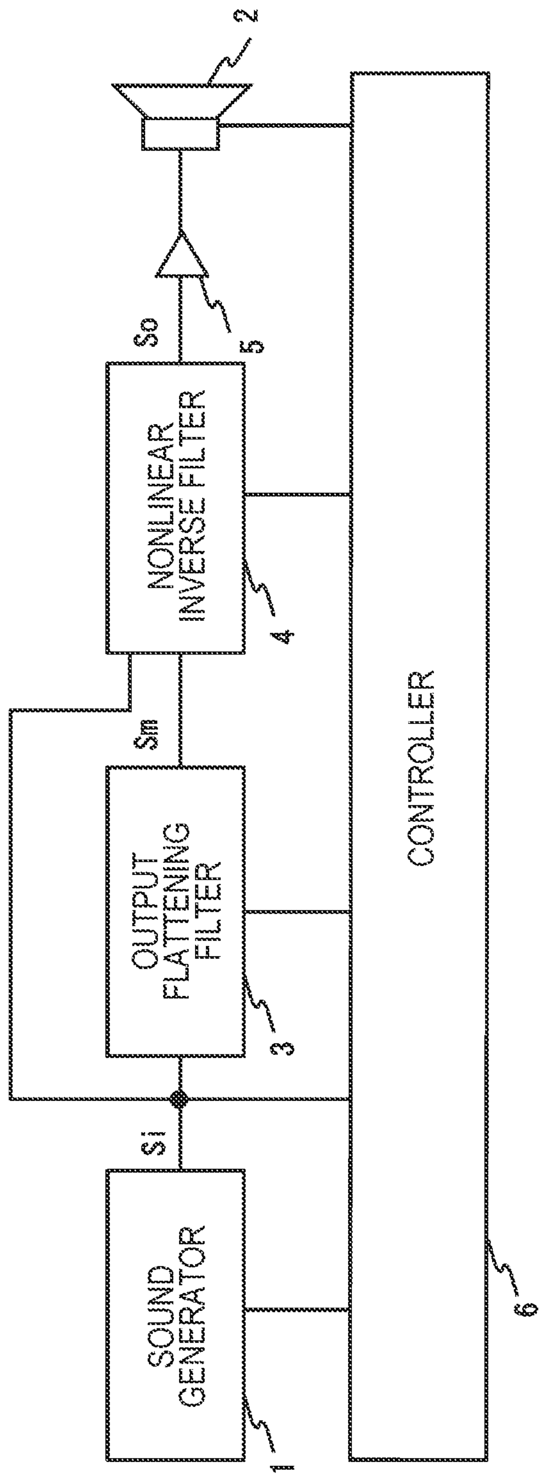
FIG. 1 is a diagram illustrating a configuration of a sound system according to an embodiment of the present disclosure.

FIG. 1 is a diagram illustrating a configuration of a sound system according to an embodiment.

As illustrated in FIG. 1, the sound system includes a sound generator 1, a speaker 2, an output flattening filter 3, a nonlinear inverse filter 4, an amplifier 5, and a controller 6.

Figure 2A:
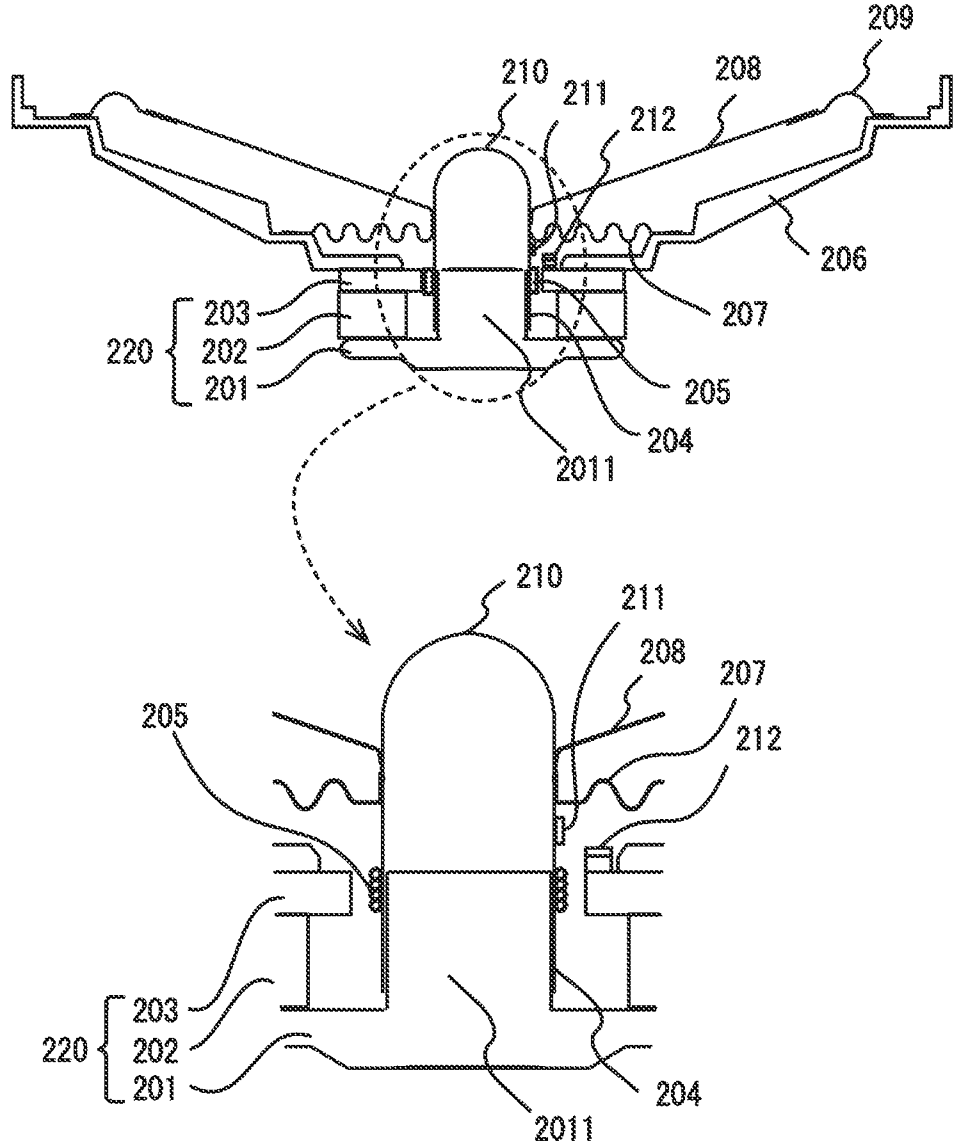
FIGS. 2A and 2B are diagrams illustrating a configuration of a vibration detection according to the embodiment of the disclosure.

FIG. 2A is a diagram illustrating a configuration of the speaker 2.

As illustrated in FIG. 2A, the speaker 2 includes a yoke 201, a magnet 202, a top plate 203, a voice coil bobbin 204, a voice coil 205, a frame 206, a damper 207, a diaphragm 208, an edge 209, a dust cap 210, a displacement detection magnet 211, and a magnetic angle sensor 212.

Assuming now that an upper side in the figure corresponds to a front side of a front speaker and a lower side corresponds to a rear side of the front speaker, the yoke 201 has a convex portion 2011 protruding forward at a center, the magnet 202 having an annular shape is disposed around a circumference of the convex portion 2011, and the top plate 203 having an annular shape is disposed on the magnet 202. The top plate 203 is then composed of an iron or other conductive material. The yoke 201, the magnet 202, and the top plate 203 form a magnetic circuit 220.

The voice coil bobbin 204 has a hollow cylindrical shape, and the voice coil 205 to which a signal from the amplifier 5 is applied is wound around its circumference. The convex portion 2011 of the yoke 201 is inserted from behind into the hollow of the voice coil bobbin 204 so that the voice coil bobbin 204 is capable of moving back and forth with respect to the yoke 201, and the voice coil 205 is located between the convex portion 2011 of the yoke 201 and the top plate 203 where a magnetic flux generated between inner edges of the top plate 203 by the magnetic circuit 220 passes through.

The diaphragm 208 has a shape roughly similar to a side of a cone with front and rear directions of the front speaker as a height direction, and its outer edge is connected to a front end of the frame 206 at the edge 209. An inner end of the diaphragm 208 is fixed to a front end of the voice coil bobbin 204.

In this configuration of the speaker 2, when a signal is applied to the voice coil 205 from the amplifier 5, an electromagnetic action between a magnetic flux generated by the magnetic circuit 220 and the signal flowing through the voice coil 205 causes the voice coil bobbin 204 to vibrate back and forth in accordance with an amplitude of the signal. When the voice coil bobbin 204 vibrates, the diaphragm 208 connected to the voice coil bobbin 204 vibrates and sound is generated in accordance with the signal supplied from the amplifier 5.

The displacement detection magnet 211 is fixed to an outer circumference of the voice coil bobbin 204 so as to move up and down with the voice coil bobbin 204 and generates a magnetic flux in a direction orthogonal to the magnetic flux generated by the magnetic circuit 220.

Figure 2B:
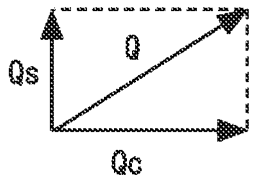

The magnetic angle sensor 212 detects and outputs, as a magnetic angle, an arc tangent Qs/Qc of an angle of a composite vector Q of a magnetic flux vector Qc acting from the magnetic circuit 220 and a magnetic flux vector Qs acting from the displacement detection magnet 211, as illustrated in FIG. 2B. Since a magnetic flux vector of the displacement detection magnet 211 acting on the magnetic angle sensor 212 changes with displacement of the displacement detection magnet 211 caused by displacement of the voice coil bobbin 204, the magnetic angle is a value according to a displacement amount of the voice coil bobbin 204.

Here, although not illustrated, the speaker 2 includes a detector that detects an input voltage and an input current, and the detector outputs information on the detected input voltage and the detected input current to the controller 6.

Returning to FIG. 1, the sound generator 1 outputs an audio signal Si, and the output flattening filter 3 adjusts gains of individual bands of the audio signal Si so that a frequency characteristic of a volume of sound output by the speaker 2 relative to the audio signal Si is flattened (flattening) and outputs an intermediate audio signal Sm thus obtained. The nonlinear inverse filter 4 corrects the intermediate audio signal Sm by signal processing adapted to adjust the gains of the output flattening filter 3 so that nonlinear distortion of the speaker 2 is suppressed, and outputs an output audio signal So thus obtained to the speaker 2 via the amplifier 5.

Here, the audio signal Si, the intermediate audio signal Sm, and the output audio signal So are digital audio signals, and the amplifier 5 converts the output audio signal So to an analog signal to be applied to the speaker 2.

Furthermore, characteristics of the output flattening filter 3 and the nonlinear inverse filter 4 are set by the controller 6.

To set the characteristics of the output flattening filter 3 and the nonlinear inverse filter 4, the controller 6 performs a filter characteristic setting process.

The filter characteristic setting process may be performed at a time of initial adjustment of the sound system, periodically, or in response to a user instruction.

Figure 6:
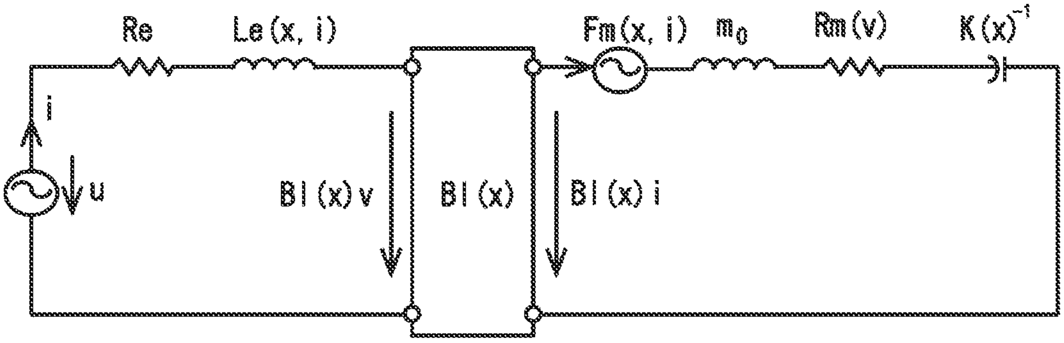
FIG. 6 is a diagram illustrating an equivalent circuit of a speaker in the related art.

In the filter characteristic setting process, the controller 6 first calculates individual parameters of an equivalent circuit of the speaker 2 illustrated in FIG. 6.

Specifically, in a state in which the controller 6 stops operations of the output flattening filter 3 and the nonlinear inverse filter 4 and sets both the output flattening filter 3 and the nonlinear inverse filter 4 to perform a through operation in which an input is output as it is, the controller 6 collects, while causing the sound generator 1 to output a prescribed test signal, data of an input voltage and an input current of the speaker 2 and a displacement x of the vibration system indicated by a magnetic angle detected by the magnetic angle sensor 212, and analyzes the collected data to calculate the individual parameters of the equivalent circuit of the speaker 2 illustrated in FIG. 6.

Subsequently, a linear approximation speaker model, which is a speaker model obtained by linearly approximating the equivalent circuit of the speaker 2, is calculated using the individual calculated parameters.

Linearizing parameters Le(x, i), Bl(x), Rm(v), and K(x) of the equivalent circuit of the speaker 2 illustrated in FIG. 6 into Le, Bl, Rm, and K, excluding the dependence on the displacement x, a velocity v of the vibration system, and an input current i of the speaker 2, the following two equations are satisfied. The linearization of a parameter may be performed, for example, by approximating the parameter with an nth-order expression and using a first-order term of the nth-order expression as a linearized parameter.

$$u=\mathrm{Re}\cdot i+Le\cdot di/dt+Bl\cdot v$$

$$Bl\cdot i=m_0\cdot d2x/dt2+Rm\cdot v+k\cdot x$$

Therefore, by solving these two equations for the displacement x, a linear approximation speaker model that shows the displacement x with respect to the input u is calculated.

Next, the controller 6 calculates a flattening speaker model, which is a speaker model that shows the displacement x with respect to the input u and that has a flat frequency characteristic of a volume of output sound of the speaker 2 with respect to the input u.

Figure 3A:
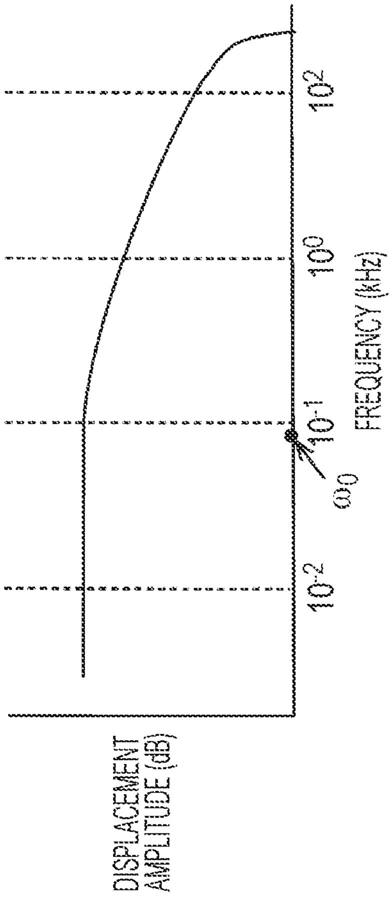
FIGS. 3A to 3D are graphs of examples of a flattening speaker model setting according to the embodiment of the present disclosure.
Figure 3B:
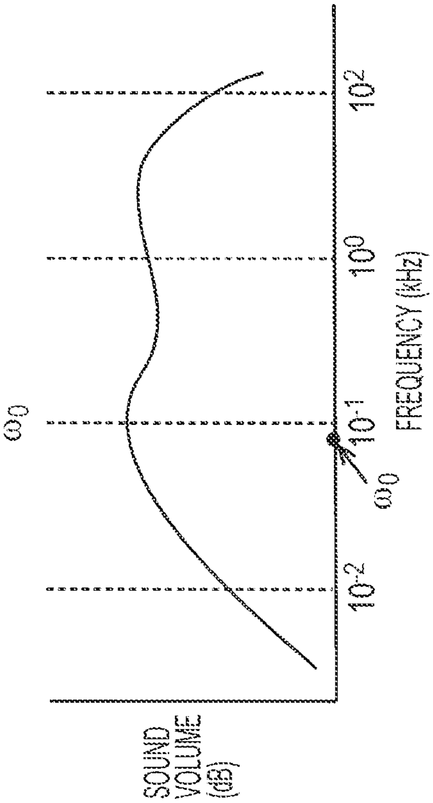

Here, in general, a frequency characteristic of the displacement amplitude of the speaker 2 becomes flat on a lower frequency side relative to a resonance frequency $\omega_0$ as illustrated in FIG. 3A, and a frequency characteristic of the volume of sound becomes lower on the lower frequency side as illustrated in FIG. 3B.

Figure 3C:
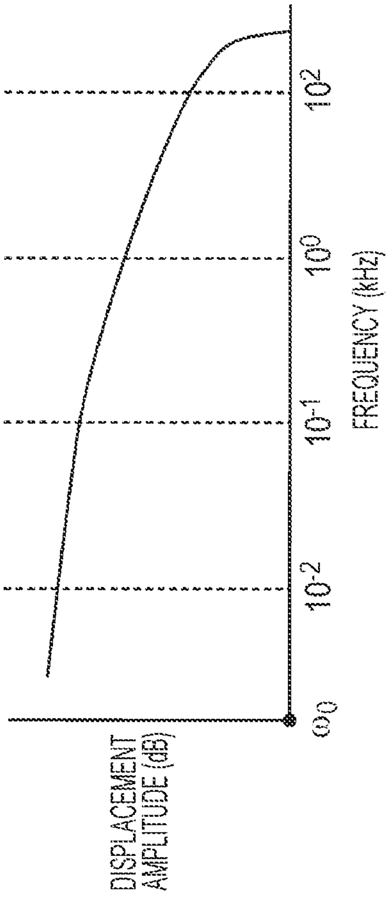
Figure 3D:
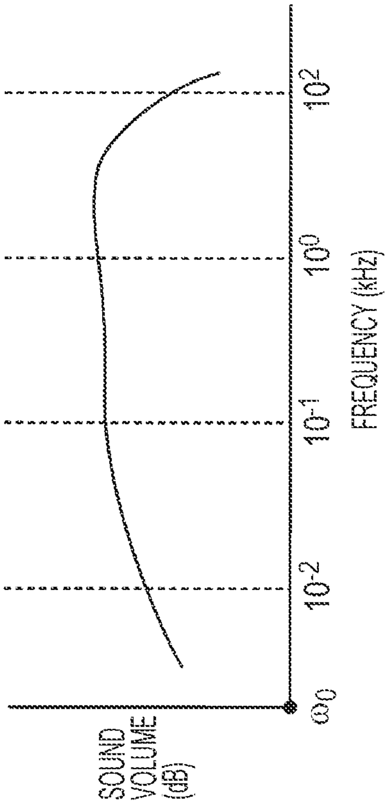

On the other hand, when the resonance frequency $\omega_0$ is on the lower side as shown in the frequency characteristic of the displacement amplitude illustrated in FIG. 3C, the sound volume may be suppressed to be fell down in a lower range as shown in the frequency characteristic of the sound volume in FIG. 3D.

Therefore, the controller 6 calculates a speaker model in which parameters of a linear approximation speaker model are adjusted so that the resonance frequency $\omega_0$ moves to the lower frequency side as a flatting speaker model.

Specifically, since the resonance frequency $\omega_0$ is $(k/m_0)^{1/2}$, a speaker model in which one or both k and $m_0$ of the linear approximation speaker model are changed so that $k/m_0$ becomes smaller is calculated as a flattening speaker model.

Subsequently, the controller 6 sets the linear approximation speaker model and the flattening speaker model that are calculated as described above to the output flattening filter 3 in the filter characteristic setting process.

Figure 4:
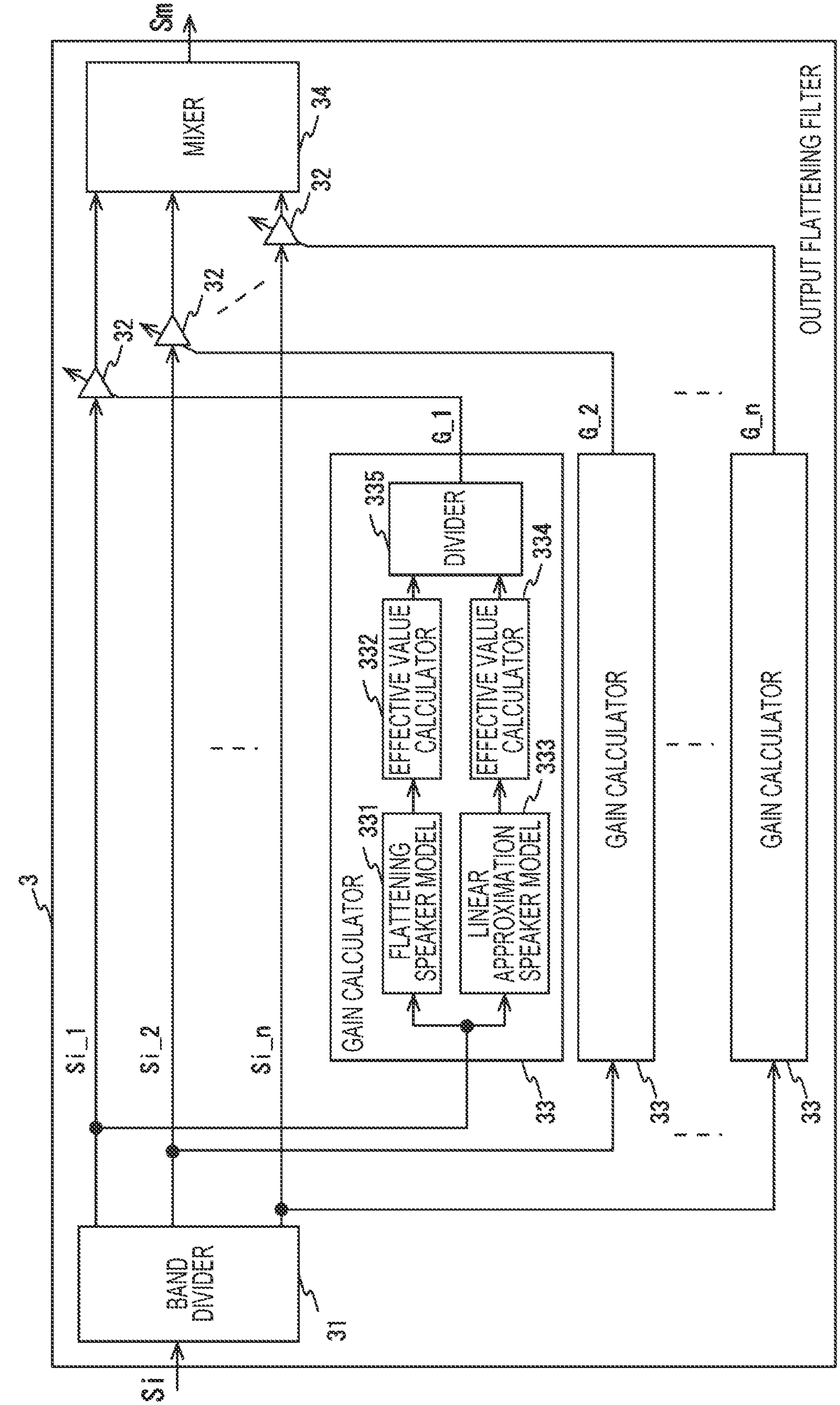
FIG. 4 is a diagram illustrating an output flattening filter according to the embodiment of the present disclosure.

Here, FIG. 4 is a diagram illustrating a configuration of the output flattening filter 3.

As illustrated in the figure, the output flattening filter 3 includes a band divider 31 that divides the audio signal Si input from the sound generator 1 into frequency bands and outputs n divided signals Si_j, n variable gain multipliers 32 that are provided in one-to-one correspondence with the n divided signals Si_j and adjust gains of the corresponding divided signals Si_j, n gain calculators 33 provided in one-to-one correspondence with the n divided signals Si_j, and a mixer 34 that mixes outputs of the n variable gain multipliers 32 and outputs an intermediate audio signal Sm as a resultant signal of the output flattening filter 3.

Furthermore, each of the gain calculators 33 has a flattening speaker model 331, an effective value calculator 332, a linear approximation speaker model 333, an effective value calculator 334, and a divider 335.

Then, in the filter characteristic setting process, the controller 6 sets the flattening speaker model calculated as described above as the flattening speaker model 331 and the linear approximation speaker model calculated as described above as the linear approximation speaker model 333.

A corresponding one of the divided signals Si_j is input to the flattening speaker model 331 and the linear approximation speaker model 333 in a j-th gain calculator 33. The effective value calculator 332 calculates an effective value RMS_C_j of an output of the flattening speaker model 331, and the effective value calculator 334 calculates an effective value RMS_L_j of an output of the linear approximation speaker model 333.

The divider 335 of the j-th gain calculator 33 controls a gain G_j of the j-th variable gain multiplier 32 to satisfy G_j=RMS_C_j/RMS_L_j.

Subsequently, in the filter characteristic setting process, the controller 6 sets characteristics determined in accordance with the individual parameters of the equivalent circuit of the speaker 2 in FIG. 6 calculated as described above to the nonlinear inverse filter 4.

Figure 5:
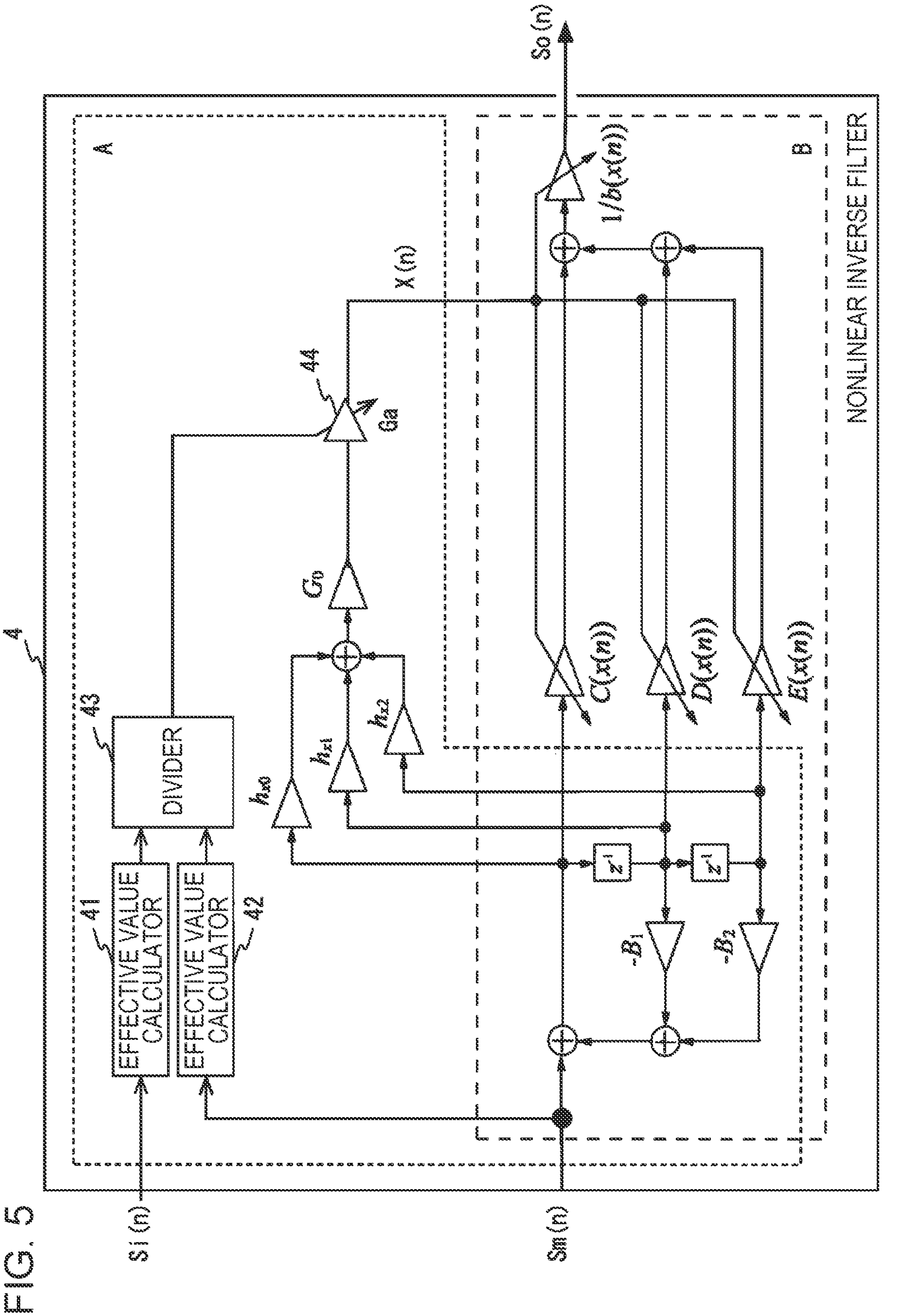
FIG. 5 is a diagram illustrating a nonlinear inverse filter according to the embodiment of the present disclosure.

Here, the configuration of the nonlinear inverse filter 4 is illustrated in FIG. 5.

As illustrated in the figure, a general nonlinear distortion correction system using a Mirror filter illustrated in FIG. 7 is used almost as is for the nonlinear inverse filter 4. Then the nonlinear inverse filter 4 applies an inverse characteristic of the nonlinear characteristic of the speaker 2 to the intermediate audio signal Sm to generate an output audio signal So in which nonlinear distortion is not generated.

A difference between the nonlinear inverse filter 4 illustrated in FIG. 5 and the nonlinear distortion correction system illustrated in FIG. 7 is that an effective value calculator 41, an effective value calculator 42, a divider 43, and a variable gain multiplier 44 are added to the nonlinear distortion correction system illustrated in FIG. 7.

The effective value calculator 41 calculates an effective value RMS_Si of the audio signal Si output by the sound generator 1, and the effective value calculator 42 calculates an effective value RMS_Sm of the intermediate audio signal Sm output by the output flattening filter 3. The divider 43 controls a gain Ga of the variable gain multiplier 44 to satisfy Ga=RMS_Sm/RMS_Si.

The variable gain multiplier 44 adjusts a displacement x(n) output by the gain multiplier corresponding to a gain Gof the nonlinear distortion correction system using the gain Ga and outputs a resultant instead of an output of a gain multiplier $G_0$.

Here, also in the nonlinear inverse filter 4 described above, in a block A, a displacement x(n) of the vibration system is presumed according to the linear speaker model, and in the block B, an amount of nonlinear distortion is presumed in accordance with a nonlinear speaker model using the displacement x(n) presumed in the block A, the input audio signal Sm is corrected so that the nonlinear distortion is not generated based on the prediction, and the corrected audio signal So is output.

The reason that the variable gain multiplier 44 adjusts an output of the gain multiplier $G_0$ using "Ga=RMS_Sm/RMS_Si", where Ga indicates a gain, is that the gain $G_0$ of the nonlinear distortion correction system is proportional to a gain $A_0$ of an audio signal, as represented by "$G_0=Bl_0 \cdot A_0/Re \cdot m_0$", and therefore, the displacement x(n) that is the output of the gain multiplier of the gain $G_0$ is corrected by a gain added by the output flattening filter 3 to the intermediate audio signal Sm so that an error is not generated in prediction of an amount of nonlinear distortion.

In the filter characteristic setting process, the controller 6 sets the characteristics of the individual gain multipliers and the individual variable gain multipliers 32 of the nonlinear inverse filter 4 that overlap with those in the nonlinear distortion correction system illustrated in FIG. 7 to the characteristics determined using the individual parameters including the nonlinear parameters of the equivalent circuit of the speaker 2 illustrated in FIG. 6 that have been calculated, so that characteristics of the nonlinear inverse filter 4 are set.

Then, after setting the characteristics of the output flattening filter 3 and the nonlinear inverse filter 4 in the filter characteristic setting process described above, the controller 6 cancels stop of the operations of the output flattening filter 3 and the nonlinear inverse filter 4 and starts operations according to the set characteristics.

An embodiment of the present disclosure has been described hereinabove.

As described above in conjunction with an exemplary embodiment, the nonlinear inverse filter 4 may be used to suppress the generation of nonlinear distortion of the speaker 2 while the output flattening filter 3 is used to flatten a frequency characteristic of a volume of sound output by the speaker 2. Furthermore, in the filter characteristic setting process, the speaker model of the speaker is calculated by measuring the displacement of the vibration system, etc., and the characteristics of the output flattening filter and the nonlinear inverse filter are set in accordance with the calculated speaker model, so that even when the characteristics of the speaker change over time, etc., the frequency characteristic of a volume of sound output from the speaker 2 may be appropriately flattened and the generation of nonlinear distortion may be appropriately suppressed thereafter by performing the filter characteristic setting process where appropriate.

The above embodiments and implementations have been described as examples of the present disclosure. It should not be interpreted that the above embodiments and implementations limit the technical range of the present disclosure. That is, the present disclosure can be practiced in various other forms without departing from the spirit and main features of the present disclosure.

The invention claimed is:

1. A speaker output characteristic correction system that corrects an output characteristic of a speaker for an audio signal output from a sound generator, the speaker output characteristic correction system comprising:

an output flattening filter configured to receive an audio signal output from the sound generator as an input first audio signal and to output a second audio signal;

a nonlinear inverse filter configured to receive the second audio signal as an input and to output a signal to the speaker:

wherein a filter characteristic for adjusting gains of individual bands of the first audio signal so that a frequency characteristic of a volume of sound output by the speaker relative to the first audio signal is flattened is set to the output flattening filter as a filter characteristic of the output flattening filter, and wherein an inverse characteristic of a nonlinear characteristic of the speaker is set to the nonlinear inverse filter as a filter characteristic of the nonlinear inverse filter;

a displacement measurement section configured to measure a displacement of a vibration system of the speaker;

a speaker model calculator configured to calculate a speaker model of the speaker having a plurality of parameters including nonlinear parameters based on the displacement measured by the displacement measurement section in a state in which a predetermined audio signal is output to the speaker; and a filter characteristic setter configured to calculate a linear approximation speaker model that is a speaker model in which the individual parameters of the calculated speaker model are linearized, to calculate a filter characteristic in which a frequency characteristic of a volume of sound output by the speaker is flattened in accordance with the calculated linear approximation speaker model, and to set the calculated filter characteristic to the output flattening filter as a filter characteristic of the output flattening filter;

wherein the filter characteristic setter is configured to set, as the filter characteristic of the linear inverse filter, a filter characteristic that matches an inverse characteristic of a nonlinear characteristic of the speaker model indicated by the parameters of the speaker model calculated by the speaker model calculator.

2. The speaker output characteristic correction system according to claim 1, further comprising:

a displacement measurement section configured to measure a displacement of a vibration system of the speaker;

a speaker model calculator configured to calculate a speaker model of the speaker having a plurality of parameters including nonlinear parameters based on the displacement measured by the displacement measurement section in a state in which a predetermined audio signal is output to the speaker; and a filter characteristic setter configured to set, as the filter characteristic of the linear inverse filter, a filter characteristic that matches an inverse characteristic of a nonlinear characteristic of the speaker model indicated by the parameters of the speaker model calculated by the speaker model calculator.

3. A sound system including the speaker output characteristic correction system according to claim 1, the speaker, and the sound generator.

4. A speaker output characteristic correction system that corrects an output characteristic of a speaker for an audio signal output from a sound generator, the speaker output characteristic correction system comprising:

an output flattening filter configured to receive an audio signal output from the sound generator as an input first audio signal and to output a second audio signal;

a nonlinear inverse filter configured to receive the second audio signal as an input and to output a signal to the speaker:

wherein a filter characteristic for adjusting gains of individual bands of the first audio signal so that a frequency characteristic of a volume of sound output by the speaker relative to the first audio signal is flattened is set to the output flattening filter as a filter characteristic of the output flattening filter, and wherein an inverse characteristic of a nonlinear characteristic of the speaker is set to the nonlinear inverse filter as a filter characteristic of the nonlinear inverse filter;

a displacement measurement section configured to measure a displacement of a vibration system of the speaker;

a speaker model calculator configured to calculate a speaker model of the speaker having a plurality of parameters including nonlinear parameters based on the displacement measured by the displacement measurement section in a state in which a predetermined audio signal is output to the speaker; and a filter characteristic setter configured to calculate a linear approximation speaker model that is a speaker model in which the individual parameters of the calculated speaker model are linearized, to calculate a filter characteristic in which a frequency characteristic of a volume of sound output by the speaker is flattened in accordance with the calculated linear approximation speaker model, and to set the calculated filter characteristic to the output flattening filter as a filter characteristic of the output flattening filter;

wherein the output flattening filter includes:

a band divider configured to divide the first audio signal into a plurality of per-band signals, which are signals for individual bands of the first audio signal;

gain calculators corresponding to the individual bands, which are configured to calculate gains of the bands;

gain adjusters corresponding to the individual bands, which are configured to provide the gains of the individual bands calculated by the gain calculators to the per-band signals of the bands; and a mixer configured to mix the per-band signals having gains adjusted by the gain adjusters and to output resultants as the second audio signal;

each of the gain calculators corresponding to the individual bands includes:

a linear approximation speaker model configured to receive a corresponding one of the per-band signals of the bands as an input;

a flattening speaker model configured to receive a corresponding one of the per-band signals of the bands as an input; and a gain output section configured to output a value obtained by dividing an effective value of an output of the flattening speaker model by an effective value of an output of the linear approximation speaker model as a gain of the corresponding one of the bands; and the filter characteristic setter is configured to:

calculate, based on the calculated linear approximation speaker model, a speaker model in which a frequency characteristic of a volume of sound output by the speaker is flatter than the linear approximation speaker model as the flattening speaker model; and set a filter characteristic of the output flattening filter by setting the calculated linear approximation speaker model and the calculated flattening speaker model in the gain calculators corresponding to the individual bands.

5. The speaker output characteristic correction system according to claim 4, wherein:

the filter characteristic setter is configured to calculate a speaker model in which the parameters of the linear approximation speaker model are changed so that a resonance frequency moves to a lower frequency side relative to a resonance frequency of the linear approximation speaker model as the flattening speaker model.

6. The speaker output characteristic correction system according to claim 5, wherein the filter characteristic setter is configured to set, as the filter characteristic of the linear inverse filter, a filter characteristic that matches an inverse characteristic of a nonlinear characteristic of the speaker model indicated by the parameters of the speaker model calculated by the speaker model calculator.

7. The speaker output characteristic correction system according to claim 4, wherein the filter characteristic setter sets, as the filter characteristic of the linear inverse filter, a filter characteristic that matches an inverse characteristic of a nonlinear characteristic of the speaker model indicated by the parameters of the speaker model calculated by the speaker model calculator.

8. A speaker output characteristic correction system that corrects an output characteristic of a speaker for an audio signal output from a sound generator, the speaker output characteristic correction system comprising:

an output flattening filter configured to receive an audio signal output from the sound generator as an input first audio signal and to output a second audio signal;

a nonlinear inverse filter configured to receive the second audio signal as an input and to output a signal to the speaker:

wherein a filter characteristic for adjusting gains of individual bands of the first audio signal so that a frequency characteristic of a volume of sound output by the speaker relative to the first audio signal is flattened is set to the output flattening filter as a filter characteristic of the output flattening filter, and wherein an inverse characteristic of a nonlinear characteristic of the speaker is set to the nonlinear inverse filter as a filter characteristic of the nonlinear inverse filter;

a displacement measurement section configured to measure a displacement of a vibration system of the speaker;

a speaker model calculator configured to calculate a speaker model of the speaker having a plurality of parameters including nonlinear parameters based on the displacement measured by the displacement measurement section in a state in which a predetermined audio signal is output to the speaker; and a filter characteristic setter configured to set, as the filter characteristic of the linear inverse filter, a filter characteristic that matches an inverse characteristic of a nonlinear characteristic of the speaker model indicated by the parameters of the speaker model calculated by the speaker model calculator;

wherein the linear inverse filter includes:

a first block configured to predict a displacement of a vibration system in accordance with a linear speaker model that is the same as or different from the linear approximation speaker model and outputs the predicted displacement;

a predicted displacement modifier configured to adjust the predicted displacement using a gain indicated by a value obtained by dividing an effective value of the second audio signal by an effective value of an audio signal output from the sound generator; and a second block configured to predict an amount of nonlinear distortion in accordance with the nonlinear speaker model using the predicted displacement adjusted by the predicted displacement modifier, to correct the second audio signal in accordance with the predicted amount of nonlinear distortion so that nonlinear distortion does not occur, and to output the resultant signal to the speaker; and the filter characteristic setter sets the filter characteristic of the linear inverse filter by setting a characteristic of the first block and a characteristic of the second block as a characteristic according to the individual parameters of the speaker model calculated by the speaker model calculator.

* * * * *